Apr. 17, 1923. 1,452,448

C. W. THOMPSON

SUPPORT FOR VEHICLE SPRINGS

Filed Aug. 16, 1922

Inventor
Clarence W. Thompson,
By H. Ralph Burton,
Attorney

WITNESS:—
Chas. L. Griesbauer

Patented Apr. 17, 1923.

1,452,448

UNITED STATES PATENT OFFICE.

CLARANCE W. THOMPSON, OF WILMINGTON, DELAWARE, ASSIGNOR TO THOMPSON SPRING COMPANY, OF WILMINGTON, DELAWARE, A CORPORATION OF DELAWARE.

SUPPORT FOR VEHICLE SPRINGS.

Application filed August 16, 1922. Serial No. 582,289.

*To all whom it may concern:*

Be it known that I, CLARANCE W. THOMPSON, a citizen of the United States, residing at Wilmington, in the county of New Castle and State of Delaware, have invented certain new and useful Improvements in Supports for Vehicle-Springs, of which the following is a specification.

This invention relates to means for supporting shock and rebound absorbing and other springs on the axle of a vehicle, and it is applicable particularly to rear-axle structures having flanges or their equivalent at their ends, with which the spring-supports are associated.

It is an object of the invention to provide a support formed in such manner that a flange to which it is connected and the securing element will be relieved of much of the strains and stresses to which the parts are subjected in use, and thus avoid the bending or tilting of the flange and tilting of the spring device.

When considered in connection with the description herein, the characteristics of the invention will be apparent from the accompanying drawing, forming part hereof, wherein an embodiment of the invention is disclosed, for purposes of illustration.

Like reference-characters refer to corresponding parts in the views of the drawings, of which—

Figure 1:
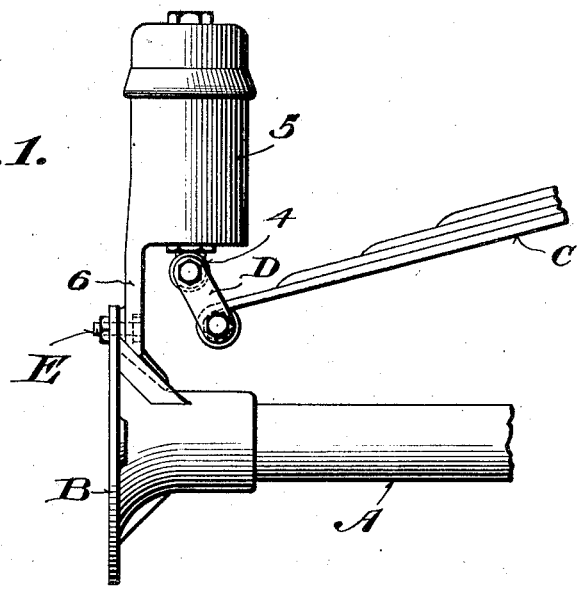
Fig. 1 is a view of a spring device and its support in association with an axle structure.
Figure 2:
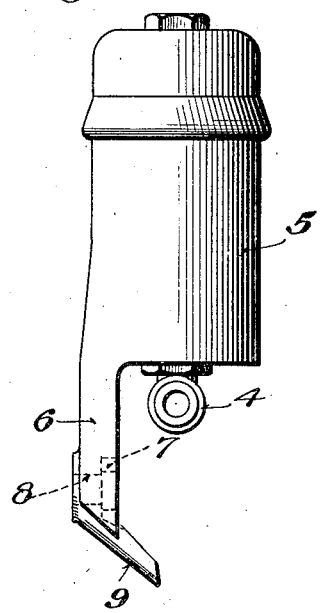
Fig. 2 is a side elevation.
Figure 3:
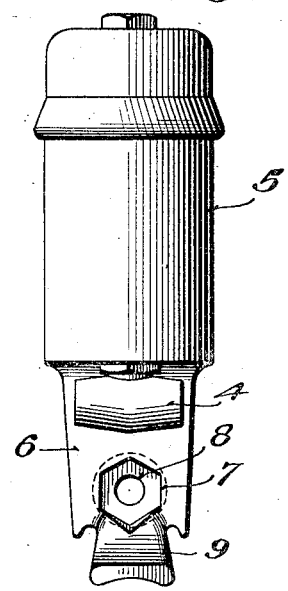
Fig. 3 is an end elevation.

Having more particular reference to the drawing, A designates an axle structure having a flange, drum, or the like B at its end portions, C a spring or other member constituting a support for the body or load-carrying part of a vehicle, and D members connecting the member C with the spring device.

The spring device includes a member 4, which extends into and is reciprocable in a casing 5, against springs or other retarding instrumentalities in the casing. The casing constitutes the spring-supporting member of the device.

The casing is carried on the axle structure by a support 6. The support preferably is formed integrally with the casing as shown. It extends downwardly, and in its portion adjacent to the casing it is disposed substantially parallel with the member 4 or with the axis of the spring-supporting member 5, and in that portion it abuts the flange or the like B, with the contour of which it conforms generally on its abutting side. The support is formed on its opposite side with a recess or seat 7, to accommodate the head of a bolt or other fastening element E extending through an opening 8 leading from the recess and into the flange or the like. The element E operates to hold the support closely against the flange or the like and on the axle structure. In its lower part, the support extends as a foot portion 9 toward the vertical axis of the casing or toward the line of movement of the member 4, and the foot portion is contoured to conform substantially to the axle structure adjacent to the flange or the like against which it abuts. In this disposition, it projects toward the center of effort imposed on the reciprocable member 4.

It will be seen that, as the foot portion is disposed under the casing 5 and extends to, or nearly to, the line of effort imposed thereon by the reciprocable member 4, the foot sustains much of the stresses that otherwise would have a tendency to cause the flange or the like to become tilted inwardly and to that extent relieves the flange or the like and the fastening element E of those stresses. It has been found in practice that, with a support of the character shown and described, the spring device does not become tilted, but retains the upright or substantially upright position it has when first installed.

Having thus described my invention, what I claim as new, and desire to secure by Letters Patent, is—

1. In a vehicle-spring device, a member constituting a spring-supporting part thereof, and extending from a side of said member a support disposed in its portion adjacent to said member substantially parallel with the axis thereof and having a foot extending toward said axis, said foot and portion of the support adjacent to said member being arranged to abut closely against an exle structure and a flange-like member thereon and to be secured against those parts.

2. In a vehicle-spring device, a member having associated therewith a yieldably-restrained reciprocable element arranged to be connected with a load-supporting part of a vehicle, and extending from a side of said member a support disposed in its portion adjacent to said member substantially parallel with the line of movement of said reciprocable element and having a foot extending toward said line, said foot and portion of the support adjacent to said member being arranged to abut closely against an axle structure and a flange-like member thereon and to be secured against those parts.

3. In a vehicle-spring device, a casing, an element reciprocable in said casing and arranged to be connected with a load-supporting part of a vehicle, a support extending from a side of said casing and disposed in its portion adjacent thereto substantially parallel with the line of movement of said reciprocable element and having a foot extending toward said line, said foot and portion of the support adjacent to said casing being arranged to abut closely against an axle structure and a flange-like member thereon and to be secured against those parts.

4. The combination in a vehicle, with an axle structure having a flange-like member thereon, of a spring device comprising a member constituting a spring-supporting part thereof, an element reciprocable in said member and connected with a load-supporting part, a support extending from a side of said member in abutment with and secured to said flange-like member, and a foot on said support extending toward the line of movement of said reciprocable element in abutment with the axle structure adjacent to said flange-like member.

5. The combination in a vehicle, with a load-carrying part and an axle structure having a flange-like member thereon, of a spring device comprising a casing, an element connected with said load-carrying part and reciprocable in said casing, a support formed integrally with and extending from a side of said casing in abutment with and secured to said flange-like member, and a foot on said support extending toward the line of movement of said reciprocable element in abutment with the axle structure adjacent to said flange-like member.

In witness whereof, I affix my signature.

CLARANCE W. THOMPSON.